US010953800B2

(12) United States Patent
Vemulapati et al.

(10) Patent No.: US 10,953,800 B2
(45) Date of Patent: Mar. 23, 2021

(54) VEHICLE CONVERSATION MIRROR ASSEMBLY AND AN OVERHEAD CONSOLE INCLUDING THE SAME

(71) Applicant: Ford Global Technologies LLC, Dearborn, MI (US)

(72) Inventors: Satyanarayana Raju Vemulapati, Westland, MI (US); Wei Xu, Nanjing (CN); Brent Dalton, Dearborn, MI (US); Derek Kang, Nanjing (CN); Alana Nisbett, Southgate, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 271 days.

(21) Appl. No.: 16/180,572

(22) Filed: Nov. 5, 2018

(65) Prior Publication Data

US 2019/0143898 A1 May 16, 2019

(30) Foreign Application Priority Data

Nov. 10, 2017 (CN) .......................... 201711104053.8

(51) Int. Cl.
*B60R 1/04* (2006.01)
*G02B 7/182* (2021.01)
*G02B 5/10* (2006.01)

(52) U.S. Cl.
CPC ................. *B60R 1/04* (2013.01); *G02B 5/10* (2013.01); *G02B 7/182* (2013.01)

(58) Field of Classification Search
CPC .... B60R 1/04; B60R 1/12; B60R 1/00; B60R 2001/1253; B60R 2011/0033; B60R 2300/8026
See application file for complete search history.

(56) References Cited

U.S. PATENT DOCUMENTS 8,100,455 B2   1/2012  Lee
9,073,494 B1 *  7/2015  Clark ........................ B60R 1/12
(Continued)

FOREIGN PATENT DOCUMENTS

KR       20050122531 A    12/2005

OTHER PUBLICATIONS

5 Useful Features in the New Honda CR-V; Aug. 8, 2012; Ang, J.K.; http://business.inquirer.net/75543/5-useful-features-in-the-new-honda-cr-v.

(Continued)

*Primary Examiner* — Jade R Chwasz
(74) *Attorney, Agent, or Firm* — David Coppiellie; Kolitch Romano LLP (57) ABSTRACT

A conversation mirror assembly comprises a first housing, a second housing pivotably connected to the first housing via a shaft, a conversation mirror connected to the second housing, a lock device, and a damping device. The conversation mirror is received in a space defined by the first housing and second housing at a stowed position; and is pivotable to a use position with the second housing. The lock device includes a first lock member connected to the first housing and a second lock member connected to the second housing, and is substantially located at a middle portion of the conversation mirror along a lengthwise direction. The damping device is located at the middle portion of the conversation mirror at the lengthwise direction, spaced apart from the lock device along the lengthwise direction and offset from the shaft.

18 Claims, 5 Drawing Sheets

(56) References Cited

U.S. PATENT DOCUMENTS

2007/0013202 A1* 1/2007 Tompson .................. B60R 7/04
                                                          296/37.1
2008/0067827 A1    3/2008 Tiesler et al.
2008/0252090 A1   10/2008 Tiesler et al.

OTHER PUBLICATIONS

Jason K. ANG-5 Useful Features in tne New Honda CR-V http://business.inquirer.net/75543/5-useful-features-in-the-new-honda-cr-v.

\* cited by examiner

VEHICLE CONVERSATION MIRROR ASSEMBLY AND AN OVERHEAD CONSOLE INCLUDING THE SAME

RELATED APPLICATION

This application claims the benefit of Chinese Patent Application No.: CN201711104053.8, filed on Nov. 10, 2017, the entire contents thereof being incorporated herein by reference.

FIELD

The present disclosure generally relates to a vehicle conversation mirror assembly with a compact packaging and an overhead console including the same.

BACKGROUND

Vehicles such as sedans or SUVs can take many passengers. Some vehicles include a conversation mirror at the top of the vehicle roof for a driver or a front row passenger to observe the rear row passengers or the conditions inside the vehicle. For some vehicles, the conversation minor is integrated into an overhead console to better utilize the space. However, the overhead console typically includes a number of components, such as a dome lamp, a glass bin. It is challenging to design the dimension and arrangement of the mirror assembly in the overhead console.

To meet the requirement of the packaging, a compromising solution is to provide a smaller minor having a greater curvature. However, such a des to a greater distortion of the image observed by the user and therefore affecting user experience.

US patent application No. US20130120864A1 discloses an overhead console apparatus. A glass case is rotatably coupled to a rotating shaft in a traverse direction of a vehicle, and the conversation mirror is accommodated in a rear portion of the glass case. Additionally, a guiding structure is located at one side of the glass case and a damper is provided at another side of the glass case.

The inventors have realized that there exists a need for a conversion mirror assembly having a compact design while providing desirable field of view.

SUMMARY

According to one aspect of the disclosure, a conversation mirror assembly is provided. The conversation mirror assembly may comprise: a first housing, a second housing pivotably connected to the first housing via a shaft, a conversation mirror connected to the second housing, a lock device, and a damping device. The damping device may be located at the middle portion of the conversation mirror at the lengthwise direction and be spaced apart from the lock device along the lengthwise direction, and the damping device may be offset from the shaft. The conversation mirror may be received in a space defined by the first housing and second housing at a stowed position; and the conversation mirror may be pivotable to a use position with the second housing. The lock device may include a first lock member connected to the first housing and a second lock member connected to the second housing, and the first and second lock members may be substantially located at a middle portion of the conversation mirror along a lengthwise direction.

In one embodiment, the second housing may comprise a base panel and a bracket. The bracket may extend from the base panel along a direction perpendicular to the base panel. And the second lock member may be disposed on the bracket. And a lock direction between the first and second lock members may be substantially perpendicular to the shaft and be substantially parallel to the base panel of the second housing at the stowed position.

In another embodiment, the damping device may comprise a first damping member disposed on the first housing, and a second damping member disposed on the second housing. At the unlocked state, the first damping member may rotate relative to the second damping member to restrict a rotating speed of the second housing about the shaft.

In another embodiment, the first housing may comprise a first bracket facing towards the second housing. The first bracket may include a first side wall, and the second housing may include a base panel and a second bracket. The second bracket may extend from the base panel along a direction substantially perpendicular to the base panel, and the second bracket of the second housing may include a second side wall substantially perpendicular to the base panel and the shaft. The second side wall may be substantially parallel to and adjacent to the first side wall, and the first damping member may be formed on the first side wall and the second damping member may be formed on the second side wall.

In another embodiment, the first and second damping members are toothed parts configured to be engaged with each other.

In another embodiment, the first damping member may be a sector gear and the second damping member may be a pinion engaged with the sector gear.

In another embodiment, the base panel of the second housing may be substantially rectangular and may include a first end and a second end. Each of the first and second ends may have a first lug and a second lug extending away from the base panel. The shaft passes through apertures on the first and second lugs and the second side wall to connect the second housing to the first housing.

In another embodiment, the conversation mirror assembly may further comprise a frame surrounding the conversation mirror. The frame may include two buckles at two rear sides of the conversation mirror, and the frame may be connected to the second housing via an engagement of the two buckles with two buckling mating structures on the second housing.

In another embodiment, the second housing may further include a rib extended from the base panel, and the rib may have a side surface configured to follow a shape of the conversation mirror to support a back of the conversation mirror.

In another embodiment, the first housing may comprise a first panel and a second panel located substantially at a same plane, and a doorframe disposed between the first and second panel. The receiving frame may include a pair of supporting arms connected to and extend away from the first and second panel and an inner housing portion connected to the supporting arms. The supporting arms and the inner housing may form a space with the second housing to receive the conversation mirror, and an outer surface of the first panel, an outer surface of the second panel and a base panel of the second housing may be substantially flush with each other at the stowed position.

In another embodiment, the supporting arms and the inner housing may define an opening for pivoting of the conversation mirror.

In another embodiment, the lock device is a push-push lock.

In another embodiment, the conversation mirror assembly may further comprise a spring sleeved on the shaft and adjacent to the damping device, and the spring may be configured to bias the second housing to the use position.

According to another aspect of the present disclosure, an overhead console of a vehicle is provided. The console may comprise a console housing at least partially received in a headliner; and a conversation mirror assembly disposed in the console housing. The conversation mirror assembly may include a first housing attached to the console housing, a second housing pivotably connected to the first housing via a shaft, a conversation mirror connected to the second housing, a lock device, and a damping device. The conversation mirror may be located in the space defined by the first housing and the second housing at a stowed position, and an outer surface of the second housing may be flush with outer surfaces of adjacent parts, and the conversation mirror may be pivotable with the second housing to be deployed to a use position. The lock device may include a first lock member connected to the first housing and a second lock member connected to the second housing, and the first and second lock members may be substantially located at a middle portion of the conversation mirror along a lengthwise direction. At a locked state, the second housing may and the conversation mirror are secured at the stowed position, and at an unlocked state, the second housing may be pivotable relative to the first housing about the shaft. The damping device may be located at the middle portion along a lengthwise direction of the conversation mirror and may be spaced apart from the lock device along the lengthwise direction, and a rotating axis of the damping device may be substantially parallel to the shaft and is offset from the shaft.

In one embodiment, the first housing may comprise a first panel and a second panel substantially positioned at a same plane, and a door frame disposed between the first and second panel. The door frame may include two supporting arms connected to and extend away from the first and second panel and an inner housing connected to the supporting arms. The supporting arms and the inner housing may define a space with the second housing to receive the conversation mirror. The second housing may include a base panel. The outer surfaces of the first panel, the second panel and the base panel of the first housing may be substantially flush with each other at the stowed position.

In another embodiment, the damping device may comprise a first damping member disposed on the first housing, and a second damping member disposed on the second housing. The second damping member may be configured to engage the first damping member. The first damping member may rotate relative to the second damping member to restrict a rotating speed of the second housing about the shaft, upon unlock of the lock device.

In another embodiment, the first housing may include a first wall, and the first damping member may be formed on the first wall. The second housing may comprise a base panel and a bracket extending from the base panel along a direction substantially perpendicular to the base panel. The bracket of the second housing may include a side wall substantially perpendicular to the shaft and adjacent to the first wall of the first housing, and the second damping member may be disposed on the side wall. The shaft may pass through an aperture on the side wall and be spaced apart from the second damping member.

In another embodiment, the bracket of the second housing may include a distal end distant from the base panel, and a second lock member may be formed on the distal end. The lock direction between the first and second lock members may be substantially parallel to the base panel of the second housing at the stowed position.

In another embodiment, the overhead console may further comprise a glass storage compartment, and one of a dome lamp, a microphone, cameras and a sensor disposed behind the first and second panels.

In another embodiment, at the stowed position and in a plane having an angle to the shaft, an intersecting point of the shaft, a contact between the first and second damping members, and a lock point of the lock device may form a triangle.

One or more advantageous features as described herein are believed to be readily apparent from the following detailed description of one or more embodiments when taken in connection with the accompanying drawings. One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

It should be noted that these figures are intended to illustrate the general characteristics of methods, structures and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF ONE OR MORE EMBODIMENTS

As required, detailed embodiments of the present invention are disclosed herein; however, it should be understood that the disclosed embodiments are merely examples of the invention that may be implemented in various and alternative forms. The figures are not necessarily drawn in scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to implement the present invention in various manners.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

As mentioned in the background, some vehicles nowadays include a conversation mirror for a front row driver or passenger to observe rear passengers' status. And it is a challenge to provide a conversation mirror in a limited space. Adopting a more curved mirror or could provide a larger field of view, while the user may observe more deformation of images which is impacting the customer satisfaction. The inventors of the present disclosure provided a conversation mirror assembly in one or more embodiments of the present disclosure to address at least one problem in the art.

Figure 1:
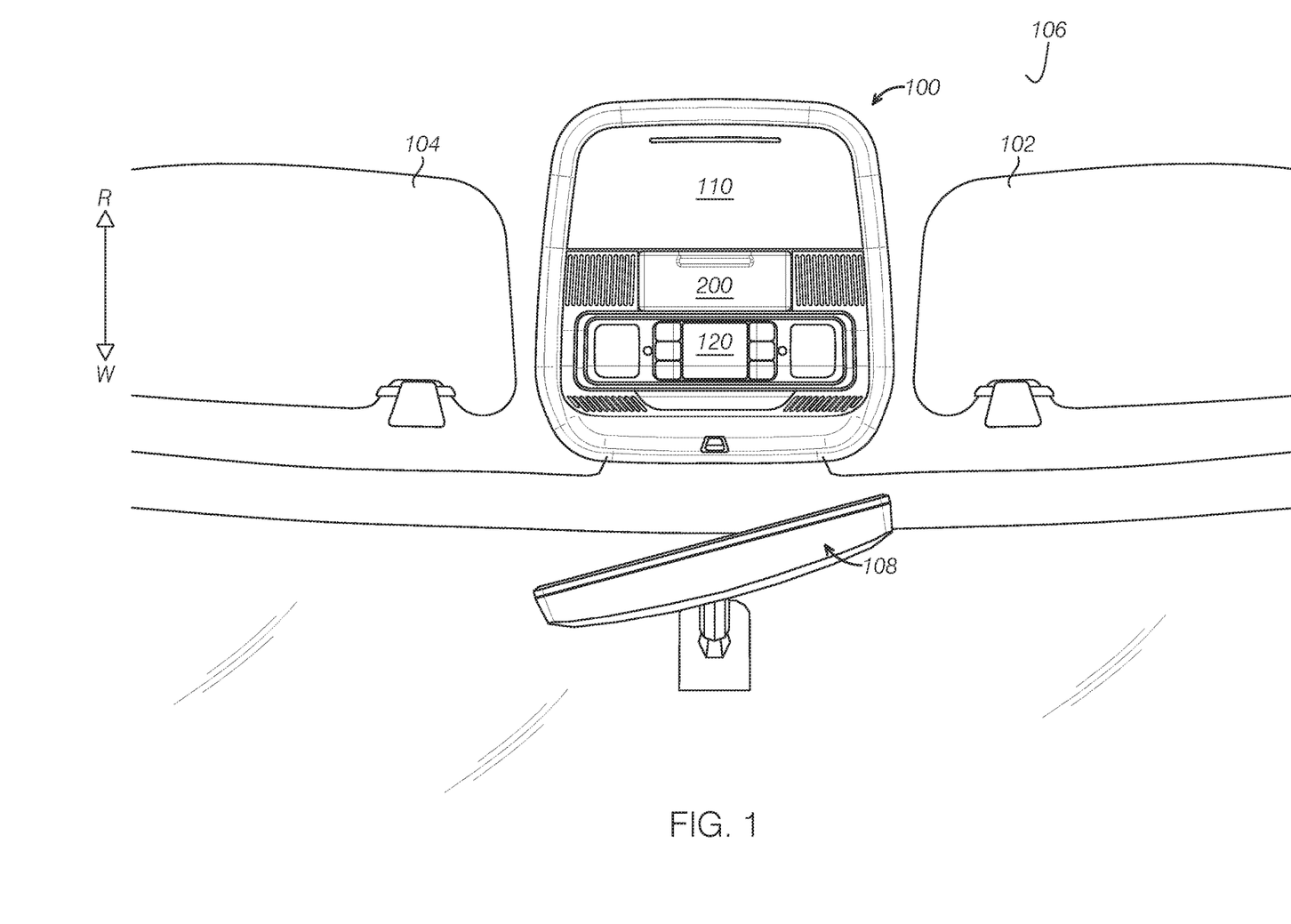
FIG. 1 illustratively depicts a plan view of an overhead console as seen from an interior of a vehicle according to one embodiment of the present disclosure.

FIG. 1 illustratively depicted a top view of a vehicle overhead console 100 according to one embodiment. As is shown, in one or more embodiments, the vehicle may include a sun visor 102 and 104 at an inside roof of the vehicle. The sun visors 102 and 104 are shown to be stowed, that is, folded and attached to a vehicle headliner 106. The vehicle may further include a rear view mirror 108 at the front of the vehicle facing rear R of vehicle and the overhead console 100 that is at least partially accommodated in the vehicle headliner 106. In FIG. 1, W indicates a front of the vehicle while R indicates a rear of vehicle. In one or more embodiments, the overhead console 100 may be integrated with multiple devices. For instance, the overhead console 100 may include a glass bin 110 to store sun glasses, a conversation mirror assembly 200 for observing rear row passengers, and a dome lamp 120 etc. As shown in FIG. 1, in one or more embodiments, the conversation mirror assembly 200 is a module in the overhead console 100. That is, the conversation minor assembly 200 is independent of other parts such as the glass bin 110. At the stowed position as shown in FIG. 1, the exposed portion of the conversation mirror assembly 200 has a substantially flushed surface with a main surface of the overhead console 100. It will be appreciated that the conversation mirror assembly 200 may also be a separate module from the overhead console 100, and it may be installed on the headliner.

Figure 2:
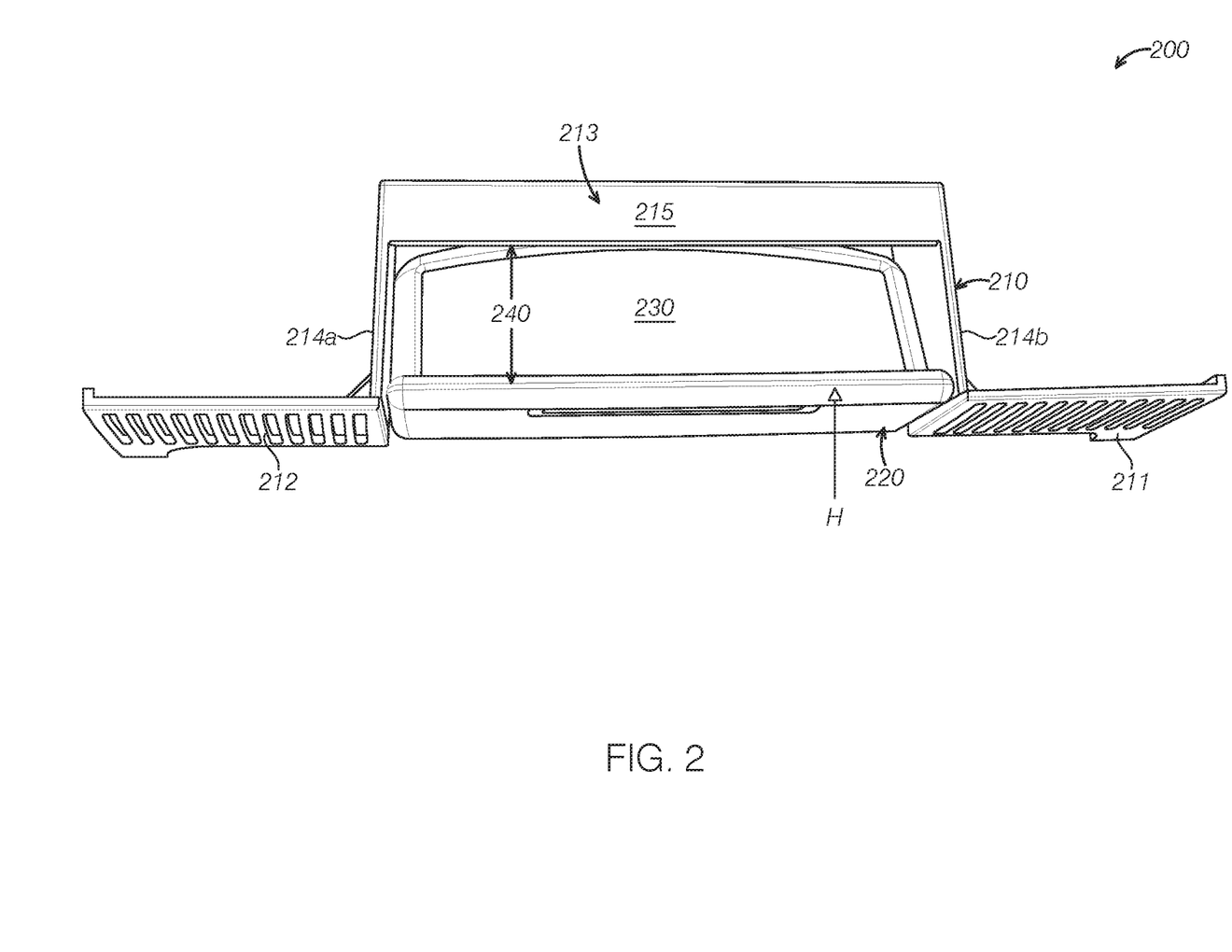
FIG. 2 illustratively depicts a profile view of a vehicle conversation mirror assembly, illustrating the conversation mirror at a stowed position.
Figure 3:
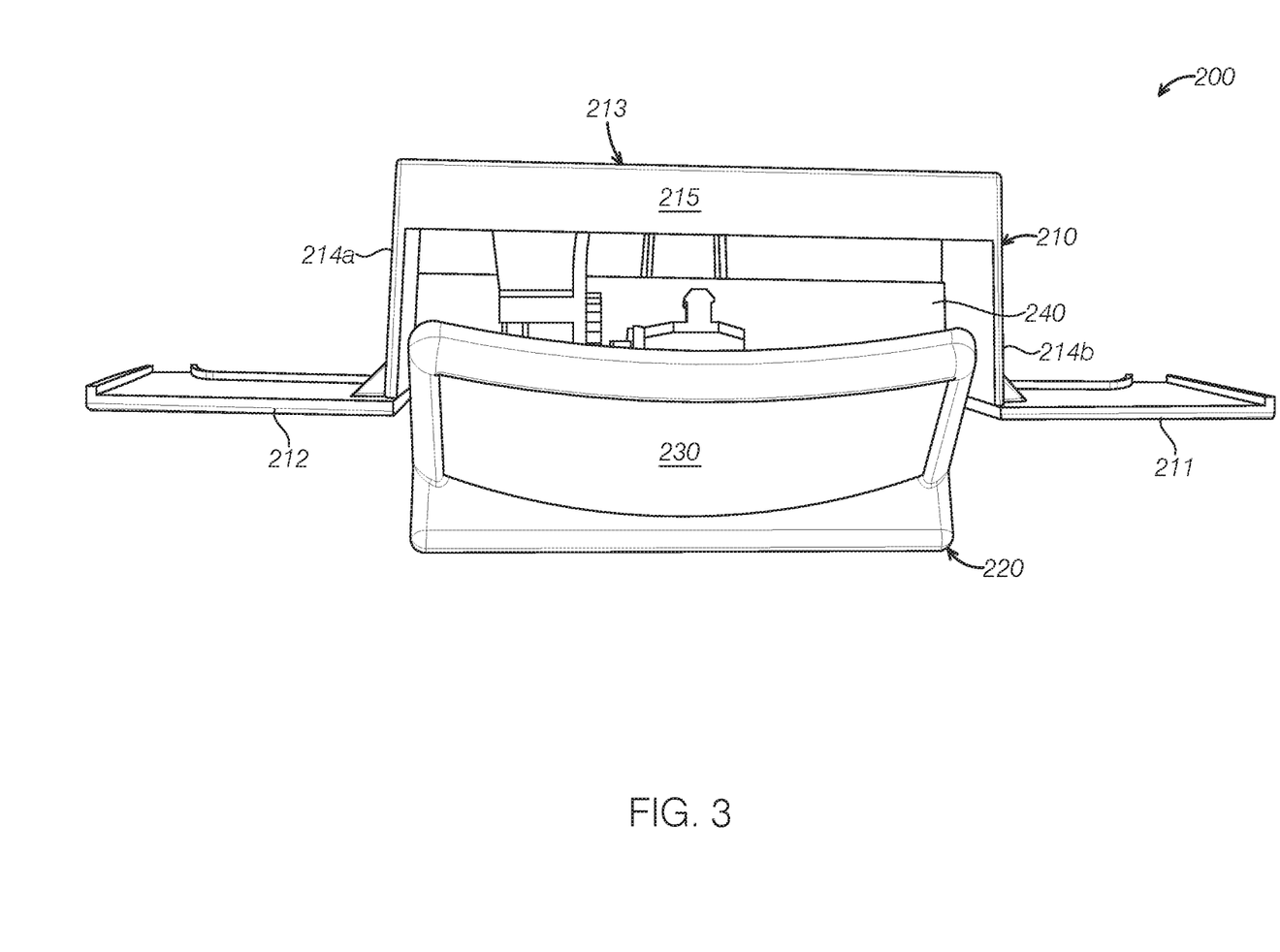
FIG. 3 illustratively depicts a profile view of a vehicle conversation mirror assembly in FIG. 2, illustrating the conversation mirror at a use position.

The structure of the conversation mirror assembly 200 at stowed and use positions will be explained further with reference to the figures. FIG. 2 illustratively depicts a profile view of the conversation mirror assembly 200 at a stowed position, while FIG. 3 shows the conversation mirror assembly 200 at an open or use position. As shown in FIGS. 2 and 3, the conversation mirror assembly 200 includes a first housing 210, a second housing 220 pivotably connected to the first housing 210, and a conversation mirror 230 connected to the second housing 220. In the depicted embodiment, the first housing 210 is partially hidden or received in the overhead console 100. In other embodiments, the first housing may be partially hidden or accommodated in the headliner 106. The conversation mirror 230 is stored in the space defined by the first housing 210 and the second housing 220, and the conversation mirror 230 may pivot along with the second housing 220 to a use position as shown in FIG. 3.

In one or more embodiments, the first housing 210 includes a first panel 211 and a second panel 212 located at substantially the same plane, and a door frame 213 between the first panel 211 and the second panel 212. The door frame 213 includes a pair of supporting arms 214a, 214b extending away from the first panel 211 and the second panel 212 and an inner housing 215 connected to the supporting arms 214a and 214b. The supporting arms 214a and 214b, the inner housing 215 and the second housing 220 define a space to accommodate the conversation mirror 230. In the depicted embodiment, the supporting arms 214a, 214b of the first housing 210 and the inner housing 215 define an opening 240 which allows the conversation mirror 230 to pivot. At the stowed position, an outer surface of the first panel 211, an outer surface of the second panel 212 and an outer surface of the second housing 220 are substantially flushed or aligned. In some embodiments, other vehicle auxiliary components may be installed behind or at the back of the first panel 211 and the second panel 212. Those auxiliary components may include one of a dome lamp, a microphone, a camera and a sensor. The terms "behind" and "the back of" herein or elsewhere may mean a side that is not visible or less visible or is relatively further to a user or passenger.

Figure 4:
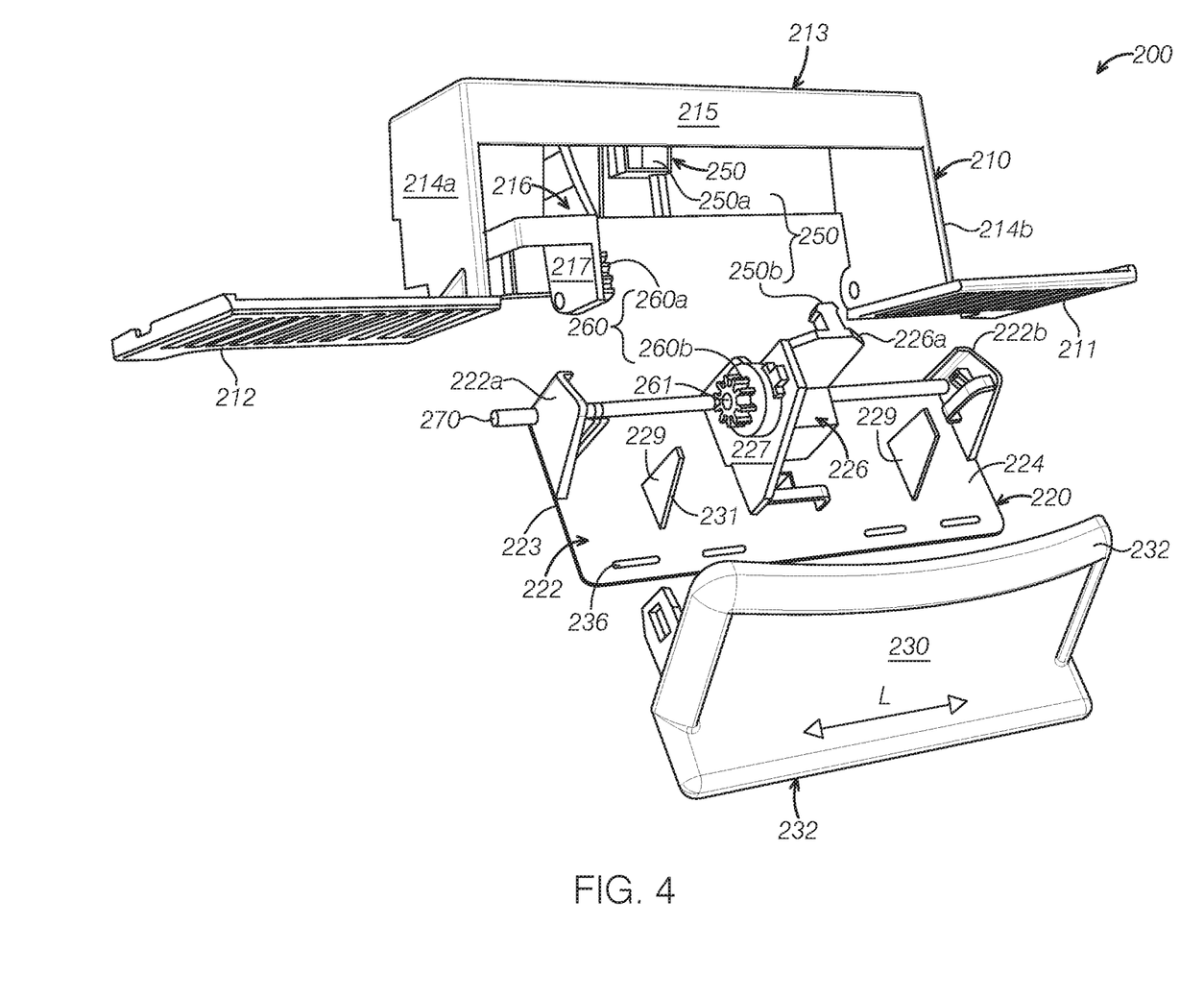
FIG. 4 illustratively depicts an exploded view of the conversation mirror assembly in FIG. 2.
Figure 5:
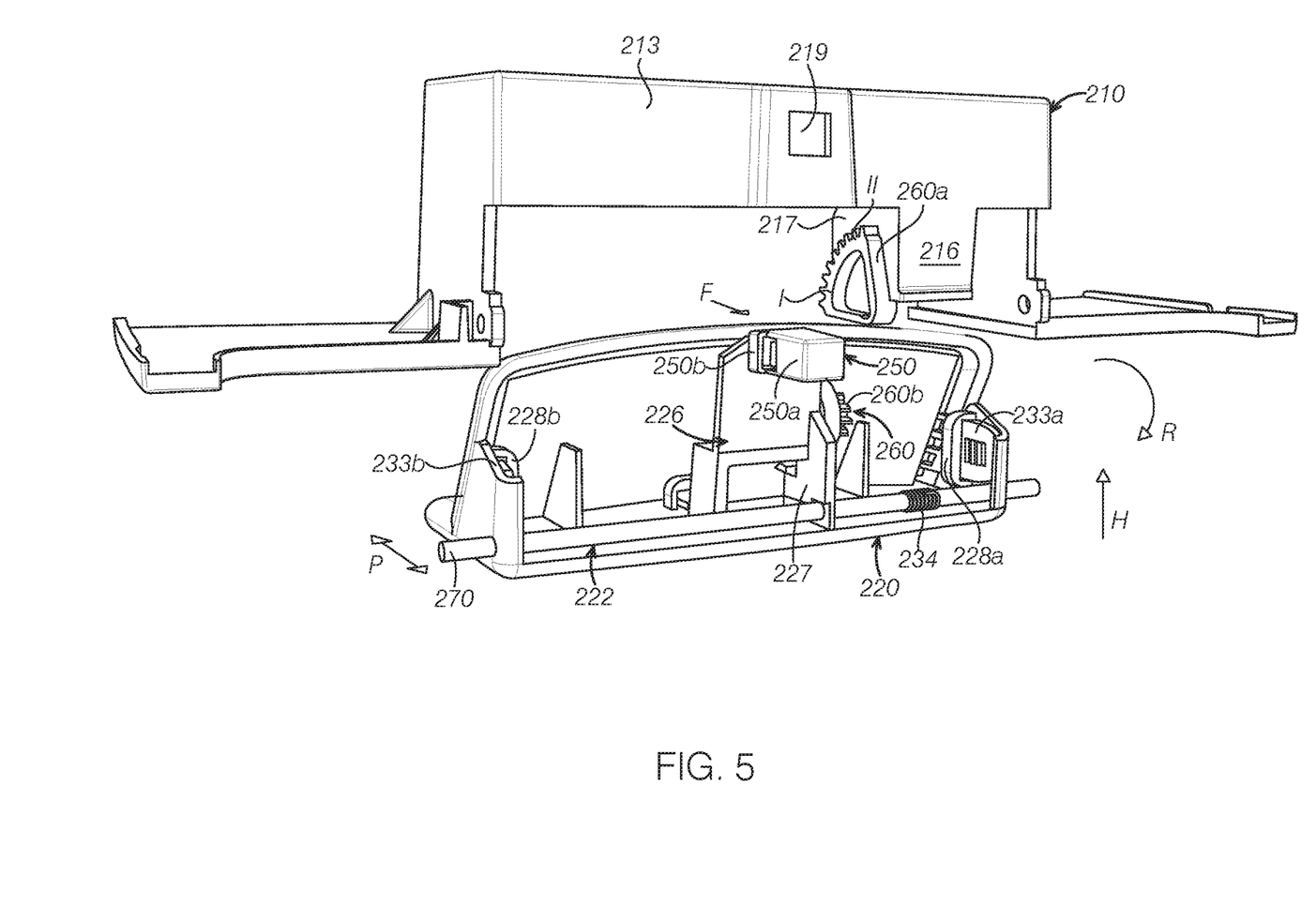
FIG. 5 illustratively depicts a perspective rear view of the conversation mirror assembly in FIG. 2.

The components and the connections of the components will be explained further with reference to FIG. 4 and FIG. 5. FIG. 4 is an explosive view of the vehicle conversation mirror in FIG. 2. FIG. 5 illustratively depicts the rear view of the conversation mirror assembly in FIG. 2. In one or more embodiments, the first housing 210 and the second housing 220 of the conversation minor assembly 200 are connected to each other via a shaft 270, and the conversation mirror assembly 200 further comprises a lock device 250 and a damping device 260.

In one or more embodiments, the lock device 250 may include a first lock member 250a connected to the first housing 210, and a second lock member 250b connected to the second housing 220. The first lock member 250a and the second lock member 250b are substantially located at the middle portion of the conversation mirror 230 along the lengthwise direction L. At a locked state, the second housing 220 secures the conversation mirror 230 at the stowed position shown in FIG. 2, and at an unlocked state, the second housing 220 pivots or rotates relative to the first housing 210 about the shaft 270 to deploy the conversation mirror 230 for the user.

In one or more embodiments, the damping device 260 is located at the middle portion of the conversation mirror 230 along the lengthwise direction L and is spaced apart from the lock device 250 along the lengthwise direction L. As shown in Figures, in one or more examples, in the plane that is perpendicular to the shaft 270, the damping device 260 and the shaft 270 are spaced apart from each other. In other words, a rotating axis 261 of the damping device 260 is different or offset from the shaft 270. The middle portion in the specification means a portion that is away from the ends of a component and closer to a middle point, including but not limit to a middle point. For instance, if the length of the conversation mirror is L, the middle portion could mean a portion that is spaced away from the ends and is ¼L to ¾L to an end. In another example, the middle portion could mean a portion that is about ⅓L to ⅔L to an end. In one or more examples, the lock device 250 may be closer to a middle point (½L) of the length of the conversation mirror 230. And the damping device 260 is close to a middle portion but is spaced from the lock device 250. By positioning the damping device 260 at the middle and rear of the conversation mirror 230, the space can be efficiently used and operating can be more robust. As the ends of the shaft is free of the lock device and the damper device, the space is available and the length of the conversation mirror 230 along the lengthwise direction can be maximized. Or such configuration allows reduced package size of the conversation mirror housing for the same length of the conversation mirror.

Referring back to FIG. 2 through FIG. 5, in one embodiment, the damping device 260 includes a first damping member 260a positioned on the first housing 210 and a second damping member 260b positioned on the second housing 220. With further reference to FIG. 5, at the locked state as shown in FIG. 2, the second damping member 260b engages a first portion of the first damping member 260a. In other words, the second damping member 260b engages the first damping member 260a at the first location I. The first location is shown in FIG. 5. At the unlocked state as shown in FIG. 3 and FIG. 4, the first damping member 260a pivots relative to the second damping member 260b and restrains a rotating speed of the second housing 220 about the shaft 270. At the use position, the second housing 220 is rotated to a position that the second damping member 260b engages a second portion of the first damping member 260a at a second location II. The second location II is shown in FIG. 5. As is shown, in the depicted embodiment, the damping device 260 is adjacent to a middle portion of the conversation mirror 230 along the lengthwise direction L. The first and second damping members 260a and 260b may be first and second toothed members. In the depicted embodiment, the first damping member 260a is a sector gear and the second damping member 260b is a gear that engages the sector gear. It will be appreciated that any appropriate damper device that restricts a relative rotating speed between two members may be used. For example, the first and second damping members may be toothed parts configured to be engaged each other.

Referring to FIG. 4 and FIG. 5, in one or more embodiments, the first housing 210 includes a first bracket 216 facing the second housing 220 and a first side wall 217. The second housing 220 includes a base panel 222 and a second bracket 226. The second bracket 226 extends from the base panel 222 along a direction substantially perpendicular to the base panel 222 and further includes a second side wall 227 that is substantially perpendicular to the base panel 222 and the shaft 270. The second side wall 227 is substantially parallel to and adjacent to the first side wall 217. The first damping member 260a is formed on the first side wall 217. The second damping member 260b is formed on the second side wall 227 and is partially engaged with the first damping member 260a. By disposing the two damping components on the first housing 210 and the second housing 220, respectively and rotatable each other, a rotation speed of the second housing 220 relative to the first housing 210 is controlled, that is, the speed of deployment of the conversation mirror 230 is controlled. A steady deployment of the conversation mirror is beneficial to the lifespan of the components, and the damping device 260 may provide stability of the conversation mirror 230 during driving of the vehicle.

In one or more embodiments, the second housing 220 is substantially rectangular and includes a first end 223 and a second end 224. The first and second ends 223 and 224 includes a first lug 222a and a second lug 222b, respectively. A main plane of the first lug 222a and the second lug 222b may be substantially parallel to the second side wall 227. The first housing 210, the first lug 222a, the second lug 222b, and the second side wall 227 include a through hole to receive the shaft 270. The shaft 270 extends through the first and second lug 222a, 222b and the second side wall 227 and connects the second housing 220 to the first housing 210. The shaft 270 passing through the second side wall 227 may add stability or robustness to the rotation of the second housing 220 relative to the first housing 210. In another embodiment, at the stowed position and in a plane forming an angle to the shaft 270, an intersecting point of the shaft 270 with the plane, a contact point of first damping member 260a and second damping member 260b, and a lock point of the lock device 250 constitute a triangular. That is, the rotating axis of the damping device 260, the rotating axis of the lock device 250 do not share the same axis with the shaft 270. In other words, they are offset from the shaft 270. Such configuration may provide better stability or strength compared to a co-axial design.

Referring to FIG. 4, in some embodiments, the conversation mirror assembly 200 further includes a mirror frame 232 surrounding the mirror 230. With further reference to FIGS. 4 and 5, the mirror frame 232 includes buckles 233a, 233b at two sides of the conversation mirror 230 and protruding toward an interior of the first housing 210. Buckling mating structures 228a and 228b are formed on the lugs 222a and 222b of the second housing 220, respectively. Through connection between buckles 233a and 233b and buckling mating structures 228a and 228b, the mirror frame 232 is connected to the second housing 220. In another embodiment, the base panel 222 of the second housing 220 may further comprise a plurality of connecting features 236 (for instance protrusions or recesses), and the mirror frame 232 may include mating features (recesses or protrusions) to connect to an inner surface of the second housing 220. In another embodiment, the second housing 220 may include one or more ribs 229 extending from the base panel 222. A side surface 231 of the rib 229 is configured to follow a shape of the conversation mirror 230 and rest against the back of the conversation mirror 230 thereby providing steady support to the mirror 230.

As shown in FIG. 4 and FIG. 5, in another embodiment, the second bracket 226 of the second housing 220 has a distal end 226a spaced away from the base panel 222. A second lock member 250b is formed on the distal end 226a formed thereon. The first lock member 250a is formed on a wall of the inner housing 213 of the first housing 210 and configured to have a channel to receive the second lock member 250b. FIG. 5 shows that the lock members 250a and 250b are at a locked position. A lock direction of the first and second lock members 250a and 250b is substantially parallel to the base panel 222 of the second housing 220 at a stowed position and is substantially perpendicular to the shaft 270. The locking direction as referred to herein or elsewhere may mean a direction illustrating a travel direction from a position when two members start to contact each other to a position when two members are locked. Correspondingly, the unlocking direction may mean a direction illustrating a travel direction from a position when two members start to separate each other to a position when two members are unlocked. In one or more embodiments, the lock member 250 is a push-push lock device, which is a push to lock and push to unlock device.

In one or more embodiments, when opening the conversation mirror 200, the user can push the second housing 220 along the height direction H (as shown in FIG. 2 and FIG. 5) of the vehicle, and the second housing 220 pivots around the shaft 270 after a force is asserted thereon. As shown in FIG. 5, after a force is applied along the H direction, the second housing 220 tends to rotate along the direction R, and this tendency urges the second lock member 250b on the second housing 220 to push the first lock member 250a along the direction F and therefore realizing unlocking of lock device. When the first lock member 250a and the second lock member 250b are unlocked from each other, under the gravity, the second housing 220 of the conversation mirror assembly 200 brings the conversation mirror 230 to rotate around the shaft 270 along a direction opposite the direction R to a use position shown in FIG. 3. In other words, the direction H at which the force is applied is substantially perpendicular to the lock direction F of the first and second lock members 250a and 250b. The lock members positioned at the middle and rear of the conversation mirror 230 allows a smaller package design and no lock device needs to be arranged at the ends or edge of the second housing 220. Or the length of the mirror 230 can be increased while using the save space. Further, the locking may be more robust. Additionally, after deploying of the conversation mirror, the lock members and damping devices are not exposed to the user, which provides a better appearance.

Referring to FIG. 4 and FIG. 5, in one or more embodiments, the conversation mirror assembly 200 may further include a spring 234. The spring 234 may be sleeved on the shaft 270 at a location that is adjacent to the second damping member 260b. The spring 234 biases the second housing 220 towards a use position, such that when the lock device 250 of the conversation mirror assembly 200 is unlocked, the spring 234 is able to urge the housing 220 to the use position. When the weight of the conversation mirror assembly is not enough to provide a biasing force or a speed, a spring 234 may function to place the conversation mirror at the use position. The spring 234 rests against the second housing 220 at a use position to provide stability at use position. It will be appreciated that the conversation mirror assembly 200 may further include positioning or restriction features to restrict an angle of rotation.

One or more embodiments of the present disclosure provide a conversation mirror assembly and overhead console comprising the same. A conversation mirror assembly is provided to include a first housing, second housing pivotably to the first housing and a conversation mirror connected to the second housing. A lock device and damping device are positioned in a middle portion of an interior of the first and second housing. Such configuration can use the space more efficiently/and the conversation mirror can have an increased length to provide a desired field of view. Better appearance, as well as operation stability can be achieved according to the embodiments of the present disclosure. Those who skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A conversation mirror assembly, comprising:
a first housing;
a second housing pivotally connected to the first housing via a shaft;
a conversation mirror connected to the second housing, wherein the conversation mirror is received in a space defined by the first housing and second housing at a stowed position; and is pivotable to a use position with the second housing;
a lock device, wherein the lock device includes a first lock member connected to the first housing and a second lock member connected to the second housing, wherein the first and second lock members are substantially located at a middle portion of the conversation mirror along a lengthwise direction; and
a damping device, wherein the damping device is located at the middle portion of the conversation mirror at the lengthwise direction and is spaced apart from the lock device along the lengthwise direction, and the damping device is offset from the shaft;
wherein the first housing comprises a first panel and a second panel located substantially at a same plane, and a door frame disposed between the first and second panel, wherein the door frame includes a pair of supporting arms connected to and extends away from the first and second panels and an inner housing connected to the supporting arms, wherein the supporting arms and the inner housing form a space with the second housing to receive the conversation mirror, and wherein an outer surface of the first panel, an outer surface of the second panel and an outer surface of a base panel of the second housing are substantially flush with each other at the stowed position.

2. The conversation mirror assembly of claim 1, wherein the second housing comprises the base panel and a bracket, and the bracket extends from the base panel along a direction perpendicular to the base panel, wherein the second lock member is disposed on the bracket, and a lock direction between the first and second lock members is substantially perpendicular to the shaft and is substantially parallel to the base panel of the second housing at the stowed position.

3. The conversation mirror assembly of claim 1, wherein the damping device comprises a first damping member disposed on the first housing, and a second damping member disposed on the second housing, wherein at an unlocked state, the first damping member rotates relative to the second damping member to restrict a rotating speed of the second housing about the shaft.

4. The conversation mirror assembly of claim 3, wherein the first housing comprises a first bracket facing towards the second housing, and the first bracket includes a first side wall, wherein the second housing comprises the base panel and a second bracket, and the second bracket extends from the base panel along a direction substantially perpendicular to the base panel, wherein the second bracket of the second housing includes a second side wall substantially perpendicular to the base panel and the shaft, wherein the second side wall is substantially parallel to and adjacent to the first side wall, and wherein the first damping member is formed on the first side wall and the second damping member is formed on the second side wall.

5. The conversation mirror assembly of claim 4, wherein the first and second damping members are toothed parts configured to be engaged each other.

6. The conversation mirror assembly of claim 5, wherein the first damping member is a sector gear and the second damping member is a pinion engaged with the sector gear.

7. The conversation mirror assembly of claim 4, wherein the base panel of the second housing is substantially rectangular and includes a first end and a second end, wherein each of the first and second ends has a first lug and a second lug extending away from the base panel, and wherein the shaft passes through apertures on the first and second lugs and the second side wall to connect the second housing to the first housing.

8. The conversation mirror assembly of claim 7, further comprising a frame surrounding the conversation mirror, wherein the frame includes two buckles at two rear sides of the conversation mirror, and the frame is connected to the second housing via an engagement of the two buckles with two buckling mating structures on the second housing.

9. The conversation mirror assembly of claim 8, wherein the second housing further includes a rib extended from the base panel, and the rib has a side surface configured to follow a shape of the conversation mirror to support a back of the conversation mirror.

10. The conversation mirror assembly of claim 1, wherein the supporting arms and the inner housing define an opening for pivoting of the conversation mirror.

11. The conversation mirror assembly of claim 1, wherein the lock device is a push-push lock.

12. The conversation mirror assembly of claim 1, further comprising a spring connected to the shaft and adjacent to the damping device, and the spring is configured to bias the second housing to the use position.

13. An overhead console of a vehicle, comprising:
a console housing at least partially received in a headliner; and
a conversation mirror assembly disposed in the console housing, the conversation mirror assembly including:
a first housing attached to the console housing,
a second housing pivotably connected to the first housing via a shaft,
a conversation mirror connected to the second housing, wherein the conversation mirror is located in a space defined by the first housing and the second housing at a stowed position, and an outer surface of the second housing is flush with outer surfaces of adjacent parts, and the conversation mirror is pivotable with the second housing to be deployed to a use position,
a lock device, wherein the lock device includes a first lock member connected to the first housing and a second lock member connected to the second housing, wherein the first and second lock members are substantially located at a middle portion of the conversation mirror along a lengthwise direction, wherein at a locked state, the second housing and the conversation mirror are secured at the stowed position, and at an unlocked state, the second housing is pivotable relative to the first housing about the shaft; and a damping device, wherein the damping device is located at the middle portion along a lengthwise direction of the conversation mirror and is spaced apart from the lock device along the lengthwise direction, and a rotating axis of the damping device is substantially parallel to the shaft and is offset from the shaft;
wherein the first housing comprises a first panel and a second panel substantially positioned at a same plane, and a door frame disposed between the first and second panel, wherein the door frame includes two supporting arms connected to and extend away from the first and second panel and an inner housing connected to the supporting arms, and the supporting arms and the inner housing define a space with the second housing to receive the conversation mirror; wherein the second housing includes a base panel, and the outer surfaces of the first panel and the second panel of the first housing and the base panel of the second housing are substantially flush with each other at the stowed position.

14. The conversation mirror assembly of claim 13, wherein the damping device comprises a first damping member disposed on the first housing, and a second damping member disposed on the second housing, wherein the second damping member is configured to engage the first damping member, wherein the first damping member rotates relative to the second damping member to restrict a rotating speed of the second housing about the shaft, upon unlock of the lock device.

15. The conversation mirror assembly of claim 14, wherein the first housing includes a first wall, and the first damping member is formed on the first wall, wherein the second housing comprises the base panel and a bracket extending from the base panel along a direction substantially perpendicular to the base panel, wherein the bracket of the second housing includes a side wall substantially perpendicular to the shaft and adjacent to the first wall of the first housing, and the second damping member is disposed on the side wall, and wherein the shaft passes through an aperture on the side wall and is spaced apart from the second damping member.

16. The conversation mirror assembly of claim 15, wherein the bracket of the second housing includes a distal end distant from the base panel, and a second lock member is formed on the distal end, wherein a lock direction between the first and second lock members is substantially parallel to the base panel of the second housing at the stowed position.

17. The conversation mirror assembly of claim 14, wherein at the stowed position and in a plane having an angle to the shaft, an intersecting point of the shaft, a contact between the first and second damping members, and a lock point of the lock device forms a triangle in the plane.

18. The conversation mirror assembly of claim 13, further comprising a glass storage compartment, and one of a dome lamp, a microphone, cameras and a sensor disposed behind the first and second panels.

* * * * *